United States Patent [19]
Fujikata

[11] Patent Number: 5,585,009
[45] Date of Patent: Dec. 17, 1996

[54] METHOD OF FILTERING THIXOTROPIC FLUIDS AND FILTER APPARATUS FOR USE IN THE METHOD

[75] Inventor: Shingo Fujikata, Kanagawa, Japan

[73] Assignee: Fuji Photo Film Co., Ltd., Kanagawa, Japan

[21] Appl. No.: 273,914

[22] Filed: Jul. 12, 1994

[30] Foreign Application Priority Data

Jul. 15, 1993 [JP] Japan .................................. 5-196680

[51] Int. Cl.$^6$ ............................ B01D 27/07; B01D 37/00
[52] U.S. Cl. ...................... 210/799; 210/806; 210/314; 210/315; 210/323.2; 210/437; 210/490; 210/497.01
[58] Field of Search ...................... 210/767, 799, 210/806, 315, 323.2, 455, 457, 483, 490, 491, 497.01, 314, 437; 118/610, 600

[56] References Cited

U.S. PATENT DOCUMENTS

| | | | |
|---|---|---|---|
| 2,565,445 | 8/1951 | Winslow et al. | 210/323.2 |
| 3,384,241 | 5/1968 | Nostrand | 210/315 |
| 3,450,632 | 6/1969 | Olson et al. | 210/799 |
| 3,800,945 | 4/1974 | Fowler | 210/767 |
| 3,950,251 | 4/1976 | Hiller | 210/315 |
| 4,147,632 | 4/1979 | Oder | 210/315 |
| 4,514,302 | 4/1985 | van Zon et al. | 210/491 |
| 5,122,270 | 6/1992 | Ruger et al. | 210/497.1 |
| 5,269,921 | 12/1993 | Ruger et al. | 210/497.1 |
| 5,275,743 | 1/1994 | Miller et al. | 210/767 |
| 5,348,660 | 9/1994 | Fujikata | 210/767 |

FOREIGN PATENT DOCUMENTS

| | | |
|---|---|---|
| 0247468 | 12/1987 | European Pat. Off. . |
| 1950068 | 6/1970 | Germany . |
| 2015890 | 9/1979 | United Kingdom . |

*Primary Examiner*—Peter A. Hruskoci
*Assistant Examiner*—Theodore M. Green
*Attorney, Agent, or Firm*—Sughrue, Mion, Zinn, Macpeak & Seas

[57] ABSTRACT

A filter assembly in housing 11 into which a thixotropic fluid is injected for filtration comprises filter layer 14c that is positioned along the central axis and which has the finest mesh, said filter layer 14c being surrounded successively in order by middle filter layer 14b having the next finest mesh and outer filter layer 14a of a coarse mesh. The thixotropic fluid injected into the housing passes through layers 14a, 14b and 14c in that order, whereby the fluid flows out of the housing through one stage of filtration steps.

10 Claims, 5 Drawing Sheets

5,585,009

METHOD OF FILTERING THIXOTROPIC FLUIDS AND FILTER APPARATUS FOR USE IN THE METHOD

BACKGROUND OF THE INVENTION

The present invention relates to a method of filtering thixotropic fluids such as magnetic paints and thick printing inks for rejecting foreign matter and agglomerates therefrom, as well as a filter apparatus for use in the method.

CONVENTIONAL ART

Magnetic paints as an example of thixotropic fluids can be manufactured by charging ferromagnetic particles into a ball mill and mixing them with a polymeric binder to form a dispersion, which is then coated on a support to produce a magnetic recording medium.

However, the magnetic paints thus manufactured contain various unwanted substances such as the particles that originate from the ball mill and other objects as a result of friction during the mixing procedure, undispersed foreign matters such as ferromagnetic particles and swollen fat globules, as well as the product of reagglomeration. It is therefore necessary to reject these unwanted substances from the magnetic paints by passing them through filters before they are coated onto the support.

See, for example, an Examined Japanese Patent Publication (Kokoku) Hei 2-62895, which teaches an apparatus having the general layout shown in FIG. 5. Paint tank 1 contains a magnetic paint 2 prepared by mixing magnetic particles with a polymeric binder and a solvent such as toluene, xylene or cellosolve in a ball mill so as to form a dispersion. The paint 1 in the tank 2 agitated with a propeller 3. The agitated paint 2 is aspirated by a pump 4 flows through a supply channel B and is passed through a filter 5 to be sent to a storage tank 6. The paint in the tank 6 is forced by a pump 7 to flow through a supply channel D and extruded through a coating head 8 to be coated on a support 9.

The filter 5 shown in FIG. 5 is usually composed of a single kind of filter medium, typically of a coarse mesh. Hence, it is capable of highly efficient trapping and, hence, rejection of the foreign matter in the magnet paint if it is comprised of large particles. On the other hand, fine particles will pass through the screen untrapped or they will often clog the gaps between the large particles trapped in screen openings, whereby the life of the filter is shortened to end prematurely. A prior art approach to the solution of this problem is shown in FIG. 6; a plurality of filters are arranged in such a way that their mesh size decreases toward the downstream end so as to prevent their clogging; in the case shown in FIG. 6, filter 5a (mesh size: 16 µm) is followed by filters 5b (8 µm) and 5c (7 µm) in that order. Another design feature of the system shown in FIG. 6 is that a portion of the filtered magnetic paint is returned to the tank 1 via a circulation channel E. According to this arrangement, the ultimate degree of filtration through filters is determined by the mesh size of the filter at the last stage and, in addition, the life of the filters used is extended.

The behavior of thixotropic fluids is unique in that gel agglomerates form if the rate of agitation is varied and that the fluid viscosity varies under shear stress. Of course, foreign matter and other gel-like agglomerates can be rejected by selecting an appropriate size for the openings in filters. However, absent clogging of the openings in a virgin filter, foreign matter will simply pass through the filter; on the other hand, openings in a deteriorated filter are clogged and this improves the precision in filtration. The result of these effects is as follows: a magnetic recording medium prepared by coating a magnetic fluid that has been filtered through virgin filters produces many dropouts during recording and reproduction; conversely, a magnetic recording medium prepared by coating a magnetic fluid that has been filtered through clogged filters produces only a few dropouts. Thus, the filtration of magnetic coating solutions by conventional techniques has had the problem of instability in the number of dropouts that occur in the magnetic recording media produced. A further problem is that the clogging of openings in filters simply results in a wastage of the coating solution. Difficulty has also accompanied the use of clogged filters since this necessitates the passage of the coating solution through filters at a sufficiently elevated initial pressure.

SUMMARY OF THE INVENTION

The present invention has been accomplished under these circumstances and has as an object providing a method by which thixotropic fluids can be filtered with consistent precision in the rejection of contaminating foreign matter and the gel-like agglomerates newly formed in the fluids and which yet reduces the possibility of the clogging of the openings in the filter while extending its service life.

Another object of the invention is to provide a filter that is suitable for use in implementation of that method.

Means for Solving the Problems

These objects of the invention can be attained by the following method and filters.

(1) A method of filtering thixotropic fluids wherein the thixotropic fluid to be filtered within one filtration region is passed successively in order through a filter element of a coarse mesh and filter elements of increasing fineness in mesh so that the rejection of contaminating foreign matter and agglomerates from the thixotropic fluid is completed through a single stage of filtration steps.

(2) A filter apparatus for filtering thixotropic fluids which comprises a filter assembly that is loaded in a housing for receiving an inflow of the thixotropic fluid to be filtered and which is formed by stacking successively in order a filter element of a coarse mesh and filter elements of increasing fineness in mesh, said filter apparatus being so adapted that the thixotropic fluid supplied to the housing is passed through the filter assembly in the housing so as to flow out of said housing through a single stage of filtration steps.

(3) A filter apparatus under (2) wherein the filter assembly in the housing which is formed by stacking successively in order a filter element of a coarse mesh and filter elements of increasing fineness in mesh is a concentric cylinder having a filter element of the finest mesh provided along the central axis, with filter elements of decreasing fineness in mesh being stacked successively in order and radially outward so that the thixotropic fluid will be passed through the filter assembly from the outer circumference toward the central axis.

The apparatus of the present invention for filtering thixotropic fluids may be so adapted that the filter assembly in the housing forms a porous concentric cylinder having a filter element of the finest mesh provided along the central axis, with filter elements of decreasing fineness in mesh being stacked successively in order and radially outward. In another embodiment, a filter element of a coarse mesh and filter elements of increasing fineness in mesh may be successively stacked in order parallel to the direction of flow of the thixotropic fluid flowing into the housing.

The term "a single stage of filtration steps" as used herein means a step in which the fluid passes through a filter element without undergoing a substantial drop in shear stress whereas the fluid that has passed through the filter element will pass through the next element as it remains practically flowable, with the cycle being repeated until the fluid passes through all the filter elements used.

DESCRIPTION OF THE PREFERRED EMBODIMENTS

The apparatus of the present invention for filtering thixotropic fluids is described below with reference to accompanying drawings.

Figure 1:
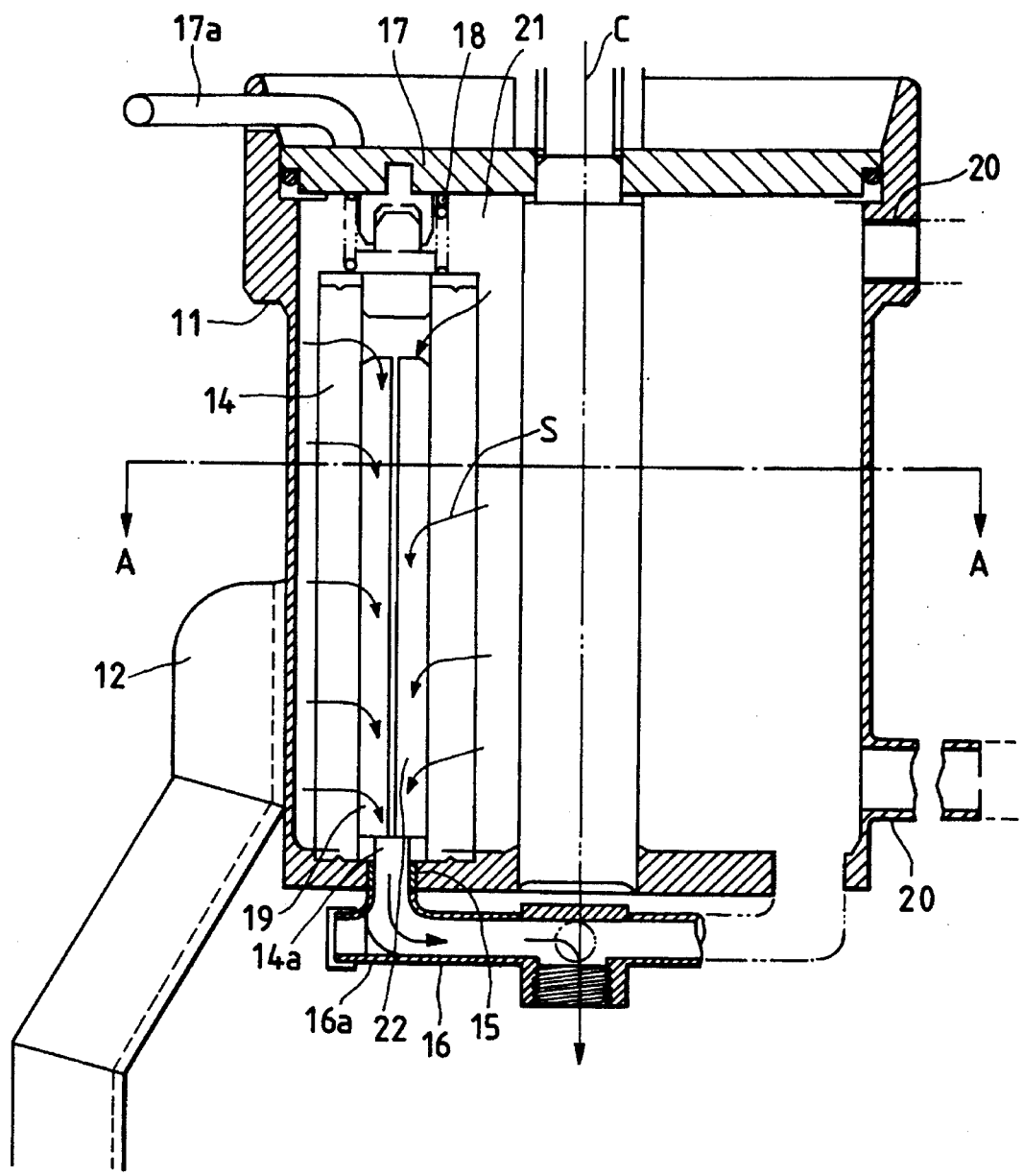
FIG. 1 is a longitudinal sectional view showing schematically the construction of the housing used in the apparatus of the present invention for filtering thixotropic fluids.
Figure 2:
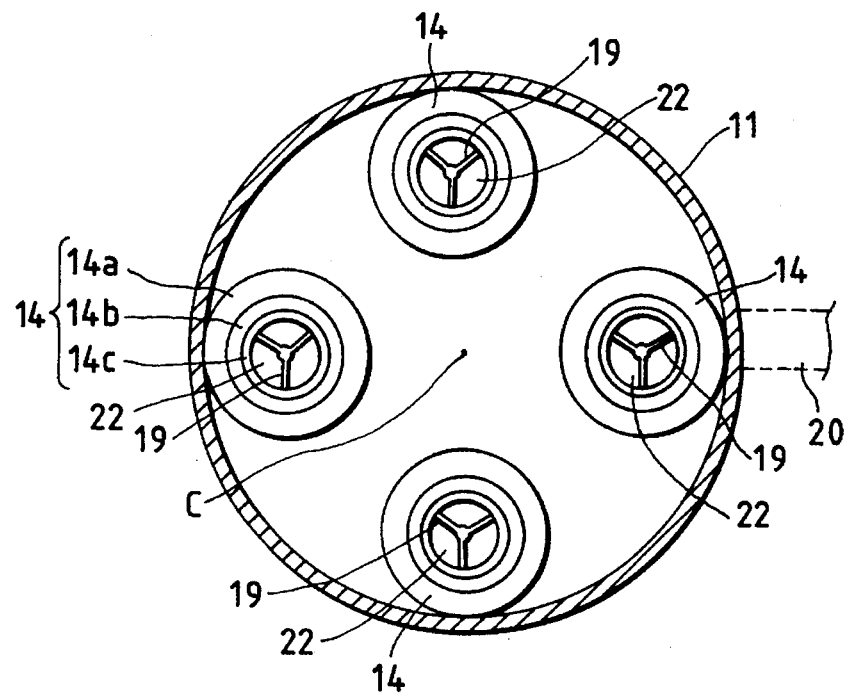
FIG. 2 is section A—A of the housing shown in FIG. 1.
Figure 3:
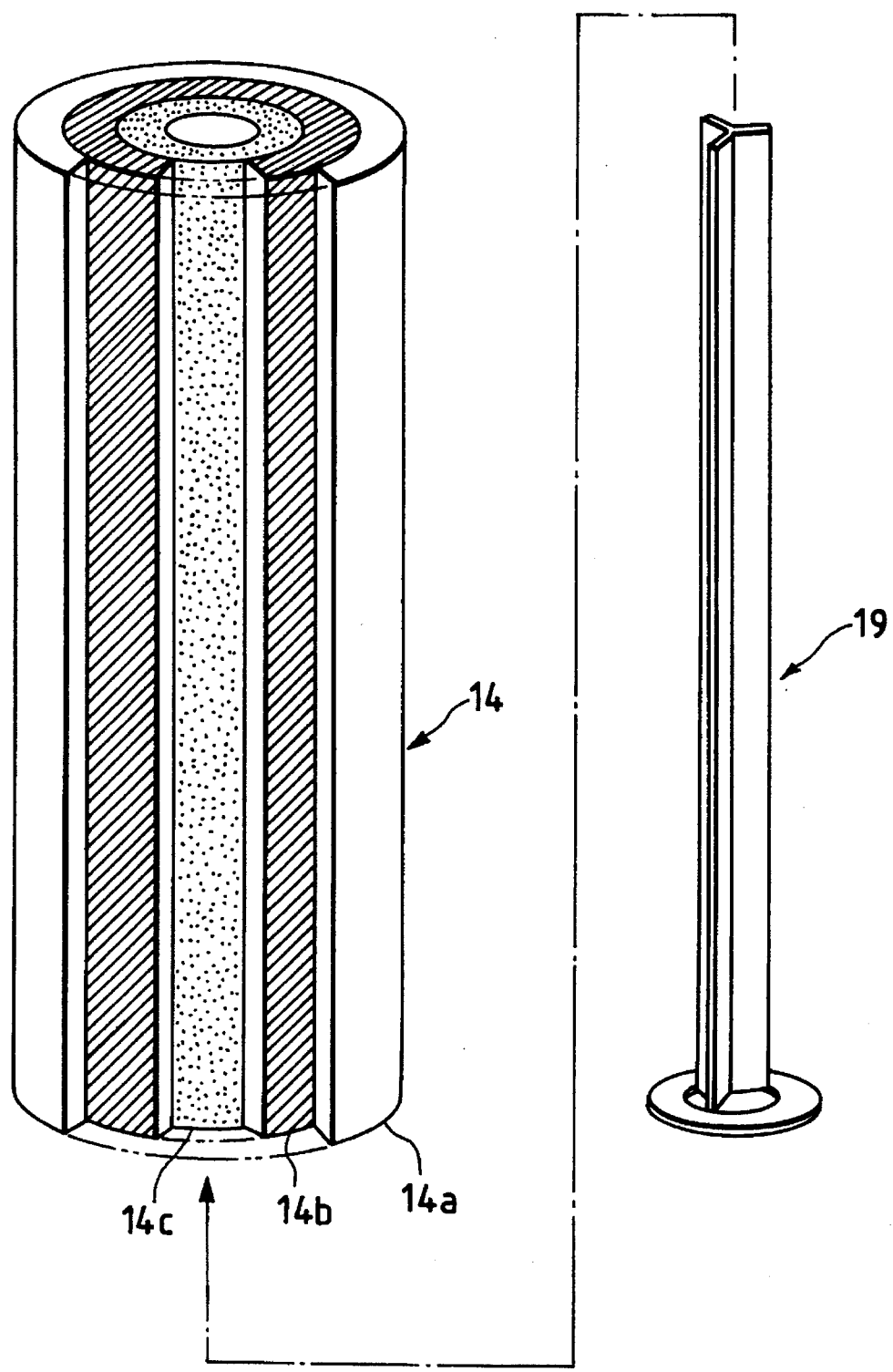
FIG. 3 is a perspective cutaway of a filter cartridge.
Figure 5:
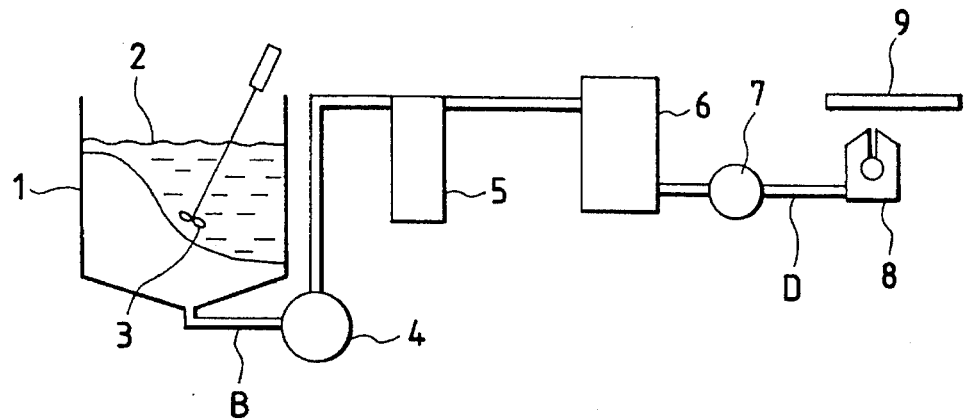
FIG. 5 is a diagram showing schematically the construction of a prior art system for coating thixotropic fluids (magnetic paint solution)

FIG. 1 is a longitudinal sectional view showing schematically the construction of the apparatus for filtering an inflow of the magnetic paint solution of interest;

FIG. 2 is section A—A of the apparatus shown in FIG. 1;

FIG. 3 is a perspective cutaway of a filter assembly; and

Figure 4:
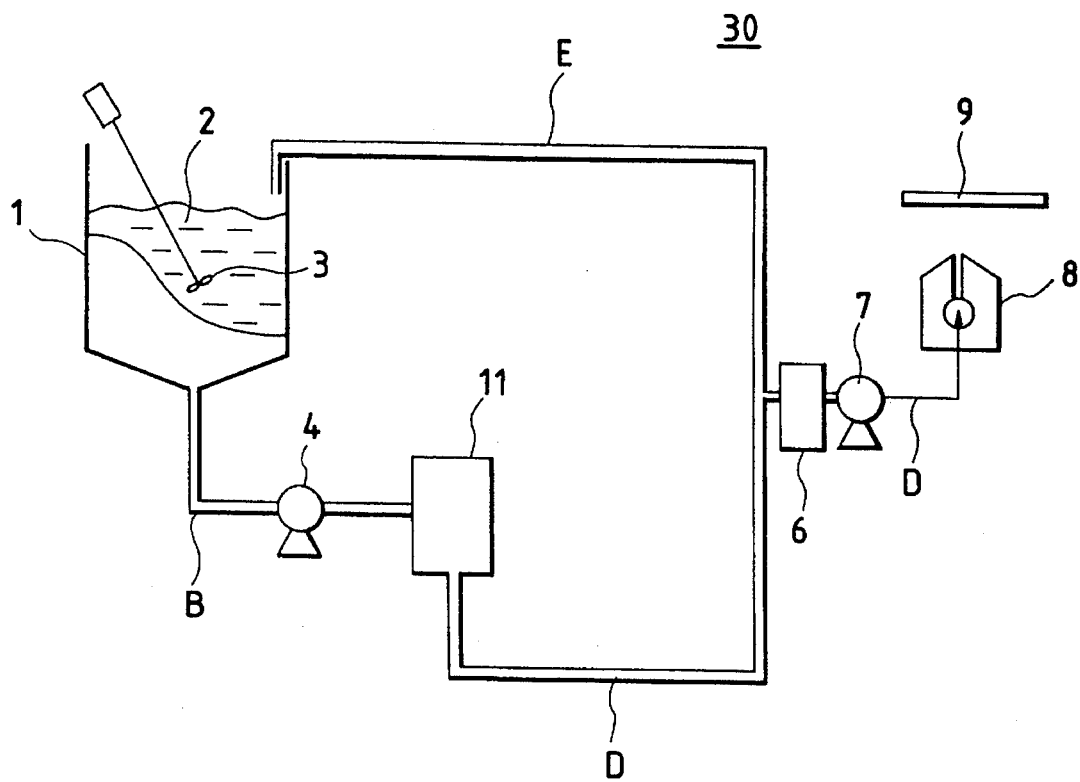
FIG. 4 is a diagram showing the circuit configuration of a system for coating thixotropic fluids (specifically a magnetic paint solution) using the apparatus of the present invention for filtering thixotropic fluids.

FIG. 4 is a diagram showing the configuration of a circuit for supplying a magnetic paint solution in a system for coating the magnetic paint on a support.

As shown in FIGS. 1 and 2, the filter apparatus under consideration comprises basically a housing 11, a plurality of cylindrical filter cartridges 14 in the housing 11, and the same number of cartridge stands 19. The housing 11 has a generally circular cross-sectional shape and receives an inflow of magnetic paint solution. The filter cartridges 14 are positioned vertically within the housing 11 by means of the cartridge stands 19 in such a way that they are spaced apart radially about the longitudinal axis C.

Each filter cartridge 14 has an opening 14d formed in the lower end portion at the bottom of the housing 11. The filtrate of a thixotropic fluid (the magnetic paint solution in the embodiment under consideration) is recovered through an outlet 15 that opens in that area of the bottom of the housing 11 which is in registry with each filter cartridge 14. The outlet 15 is fitted with an end portion of a fluid recovery pipe 16. The upper end portion of each filter cartridge 14 is provided with a cylindrical metal retainer 18 which bears the downward compressive force of a cover 17 on the housing 11.

The housing cover 17 in turn is provided with a handle 17a for lifting it open in certain cases such as the replacement of filter cartridges 14.

The lower part of the recovery pipe 16 is provided with a curved angle member 16a which ensures that the filtrate of the magnetic paint solution in the housing 11 will flow out smoothly into the bent portion of the pipe (which is the lower right portion of FIG. 1). To operate the apparatus, a pump 4 (see FIG. 4) is turned on so that the magnetic paint 2 stored in a paint tank 1 is injected into the primary space 21 of the housing 11 via injection pipes 20 connected to the sidewall of the housing 11.

The magnetic paint solution injected into the primary space 21 of the housing 11 has any contaminating foreign matter and agglomerates filtered off as it passes through the filter cartridges 14. The filtrate then passes through the through-hole formed in the central axial portion of each filter cartridge 14 which provides the secondary space 22 and, thereafter, the filtrate flows out into the recovery pipe 16 fitted in the outlet 15 at the lower end of the housing 11, from which it emerges.

The housing 11 is structurally so designed that a dead space will not easily form in the secondary space 22. Stated specifically, the secondary space 22 is defined by the cylindrical space within each filter cartridge 14. The magnetic paint solution penetrates the filtering wall surface of each filter cartridge 14 (as indicated by arrows S in FIG. 1) and flows toward the filtrate outlet 15.

The filter apparatus under discussion has four filter cartridges 14 contained in the housing 11 in such a way that they are spaced apart about the central axis C. As shown in FIG. 3, each filter cartridge 14 is formed by stacking filter layers 14a, 14b and 14c of different mesh sizes concentrically with the central axis; the inner filter layer 14c positioned the closest to the center has a mesh size of 7 µm, with the middle and outer filter layers 14b and 14a having mesh sizes of 8 µm and 16 µm, respectively. Each filter cartridge 14 is supported in an erect position by the cartridge stand 19 as shown in FIG. 1.

The bottom of the housing 11 is provided with the filtrate outlet 15 in a position in registry with the opening 14d in the lower end portion of each filter cartridge 14 and the outlet 15 is fitted with an end portion of the recovery pipe 16.

The housing 11 is provided with injection pipe 20 in an upper and a lower position of the sidewall. As shown in FIG. 4, these injection pipes 20 are connected to a supply pipe B from the paint tank 1, so that the magnetic paint solution 2 pumped out of the tank 1 will be injected into the housing 11.

As is apparent from FIG. 4, the housing 11 admits an inflow of the stored magnetic paint from the tank 1 via pipe B and the output of the housing 11 is connected to a storage tank 6 via pipe D. Part of the paint filtrate can be returned to the tank 1 via a feedback path E.

The filtrate of the paint solution in the tank 6 is forced by a pump 7 to be discharged to a coating head 8, through which it is extruded to be coated on a support 9.

The magnetic paint supplied into the primary space 21 of the housing 1 is filtered as it penetrates each filter cartridge 14 radially inward to reach the secondary space 22. Each filter cartridge 14 consists of filter elements having mesh sizes of 16 µm, 8 µm and 7 µm as taken in the direction toward the center. Since these filter elements are stacked to provide the mesh profile just specified above, the magnetic paint which has passed through the filter element of the mesh size 16 μm will immediately pass through the next filter element of the mesh size 8 μm before the applied shear stress decreases. Similarly, the magnetic paint which has passed through the filter element of the mesh size 8 μm will immediately pass through the next filter element of the mesh size 7 μm before the applied shear stress decreases. The magnetic paint passing through the filter elements of the mesh sizes 8 μm and 7 μm is subjected to a sufficiently high shear stress to be kept highly flowable. As a result, the magnetic paint becomes highly penetrable through the individual filter elements and there will be no scum deposition on the filter elements of the mesh sizes 8 μm and 7 μm and, in addition, the chance of clogging is greatly reduced.

The foregoing example employs three filter elements having a different mesh size. However, the number of the filter elements is not limited thereto or thereby. At least two filter elements are sufficient for enabling the present invention. Preferably, two to five filter elements can be employed, and the most preferable number of which is three or four.

Further, the mesh size of the filter element is preferably selected from a range between 3 μm to 20 μm. More preferably, the mesh size of 4 μm to 18 μm is selected. The combination of mesh size for the filter elements is so determined that the time for exchanging the filter elements would be the same, that is, the duration of each of the filter elements terminates substantially at the same time.

The magnetic paint is composed of a ferromagnetic powder, a polymer binder and an organic solvent for dissolving the polymer binder. The magnetic paint may contain inorganic grains and a lubricant is desirable. The magnetic paint of this type is disclosed, for example, in U.S. Pat. No. 4,997,696 and U.S. Pat. No. 5,063,105 which are incorporated herein by reference.

The foregoing embodiment is directed to the case of using a magnetic paint solution as the thixotropic fluid. It should, however, be mentioned that the method and filter of the present invention for filtering thixotropic fluids are in no way limited to the case of using magnetic paint solutions and that they are also applicable to the purpose of filtering thick printing inks and various other paint solutions including coating solutions for the manufacture of photographic materials.

As described above, the method and filter of the present invention for filtering thixotropic fluids are characterized in that a thixotropic fluid to be filtered within one filtration region is allowed to pass through a filter assembly which is formed by stacking successively in order a filter element of a coarse mesh and filter elements of increasing fineness in mesh and this enables the thixotropic fluid to be filtered continuously without reducing the shear stress which is exerted on the fluid. Consequently, the thixotropic fluid is positively filtered through the individual filter elements in a highly precise and consistent manner, with coarse contaminating foreign matter and agglomerates being rejected in the decreasing order of the mesh size of the filters. A particular advantage is that the shear stress on the thixotropic fluid will not drop even in the process of passage through filter elements of the finer mesh and, hence, there will be no scum deposition on those filter elements, which permit positive rejection of unwanted substances that will otherwise clog the filters being used. As a result, not only can the service life of the filter elements be extended but also the wastage of thixotropic fluids can effectively be prevented.

The filter elements to be used in the invention are arranged in such a way that an element of a coarse mesh and elements of increasing fineness in mesh are stacked successively in order to provide a filter assembly through which the thixotropic fluid is passed within one filtration region. In other words, the filter elements can be assembled to achieve filtration through a single stage; therefore, the filter apparatus of the present invention can be realized as a comparatively compact system at low production cost.

The last filter element to be used in the invention has little possibility for clogging and assures high precision in filtration; this offers the added advantage of achieving a precision in filtration comparable to the prior art level even if the last filter layer which determines the final precision in filtration has a mesh size that is 90% of the conventional value.

EXAMPLES

The following examples are provided for the purpose of further illustrating the advantages of the invention.

Example 1

Using experimental setups having the arrangements shown in FIG. 1 (for filter apparatus) and in FIG. 4 (for the applicator), magnetic coating solutions as thixotropic fluids were applied to supports, thereby preparing samples of magnetic recording medium. The results were compared with those of the prior art system in terms of the filter life, initial pressure and the loss of magnetic coating solutions. The coating head 8 used in Example 1 was of an extrusion type.

Figure 6:
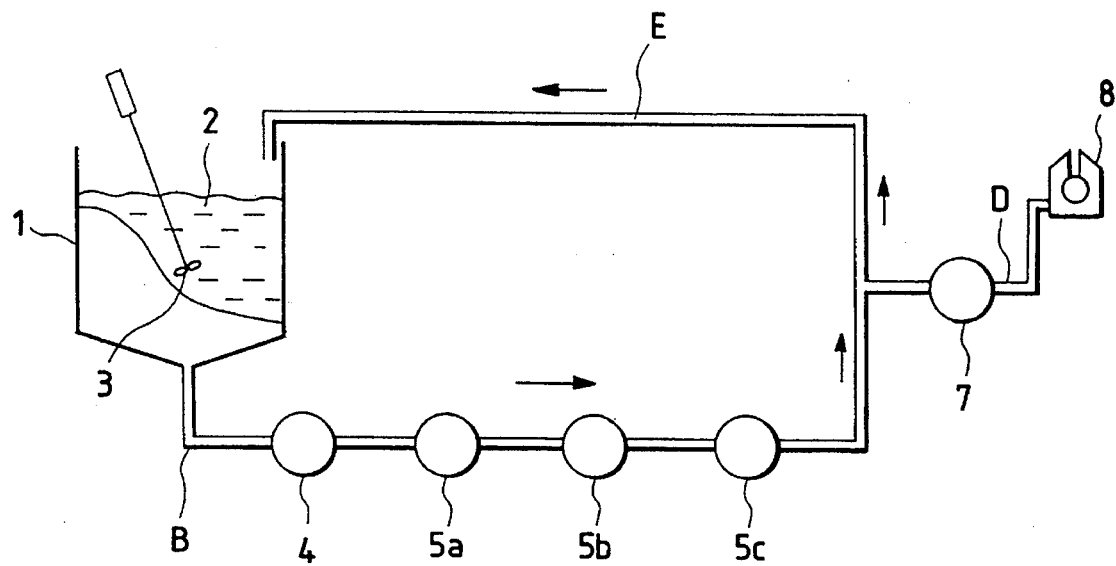
FIG. 6 is a diagram showing schematically the construction of another prior art system for coating thixotropic fluids.

In the comparative example, three separate filter units having mesh sizes of 16 μm, 8 μm and 7 μm were connected by pipes in the decreasing order of the mesh size to construct a filter apparatus of the configuration shown in FIG. 6 and coating solutions filtered with that apparatus were applied with equipment having the construction also shown in FIG. 6, which was substantially the same as the layout shown in FIG. 4, except for the manner in which individual filter units were connected.

The coating solutions were the following three: coating solution A for the manufacture of metal tapes; coating solution B for the manufacture of broadcasting magnetic tapes; and coating solution C for ½ in. magnetic tapes. The formulations of the three coating solutions are given below.

| (Solution A) Metal tape | |
|---|---|
| Alloyed ferromagnetic powder | 100 (parts) |
| MR 110 (—SO$_3$Na containing vinyl chloride resin) | 10 |
| UR 8300 (—SO$_3$Na containing polyurethane resin) | 10 |
| Polyisocyanate (Collonate L) | 5 |
| Myristic acid | 1 |
| Butyl stearate | 2 |
| Methyl ethyl ketone | 150 |
| Butyl acetate | 150 |
| (Solution B) Broadcasting magnetic tape | |
| CO-doped α-Fe$_2$O$_3$ powder | 300 (parts) |
| Vinyl chloride resin (SO$_3$H epoxy group containing MR 110) | 38 |
| Polyurethane resin (Crisbon 7209) | 18 |
| Carbon black (Valcan XC72; average particle size = 30 mμ) | 12 |
| Abrasive α-Al$_2$O$_3$ (HIT 100) | 18 |
| Oleic acid | 3 |
| Cyclohexanone | 150 |

| | |
|---|---|
| Butyl acetate | 850 |
| tert-Butyl myristate | 3 |
| Polyisocyanate (Collonate 3040) | 21 |
| Stearic acid | 3 |
| Butyl acetate | 100 |
| (Solution C) ½ in. magnetic tape | |
| Alloyed iron powder | 100 (parts) |
| Vinyl chloride/vinyl acetate/vinyl alcohol copolymer | 12.5 |
| Polyester polyurethane | 7.5 |
| Oleic acid | 2 |
| Butyl stearate | 1 |
| Alumina | 2 |
| Carbon black (average particle size = 10 μm) | 2 |
| Methyl ethyl ketone | 200 |

Each of the magnetic coating solutions thus prepared was charged into tank 1 (see FIG. 1) and agitated with propeller 3 as it was forced by pump 4 to be sent to housing 11 via supply pipe B. In housing 11, the magnetic coating solutions were filtered through filter cartridges 14 and then sent to storage tank 6. The filtered magnetic coating solutions stored in tank 6 were forced by pump 7 to be fed through supply path D to coating head 8, from which they were applied to polyester films 9 (thickness: 15 μm; surface roughness: 0.1 μm) at a speed of 100 m/min to form coatings over a width of 300 mm in a thickness of 5 μm.

The system of the present invention and that of the comparative example were operated under the conditions set forth above, thereby to prepare samples of magnetic recording medium. The samples were evaluated for the number of dropouts, the filter life (as expressed by the life of filter cartridges), the initial pressure in use, and the loss of magnetic coating solutions.

In the example of the present invention, the number of dropouts was stable, indicating the preparation of magnetic recording medium samples of consistent quality. As for the example, it is also worth mentioning that the filter life was long, only low initial pressure was needed to supply the coating solutions and, what is more, satisfactory results could be attained with a single-stage filter apparatus.

On the other hand, the number of dropouts produced by the samples prepared in the comparative example varied greatly and a higher initial pressure was necessary to produce magnetic recording medium samples of consistent quality. Furthermore, the equipment used in the comparative sample was bulky.

Figure 7:
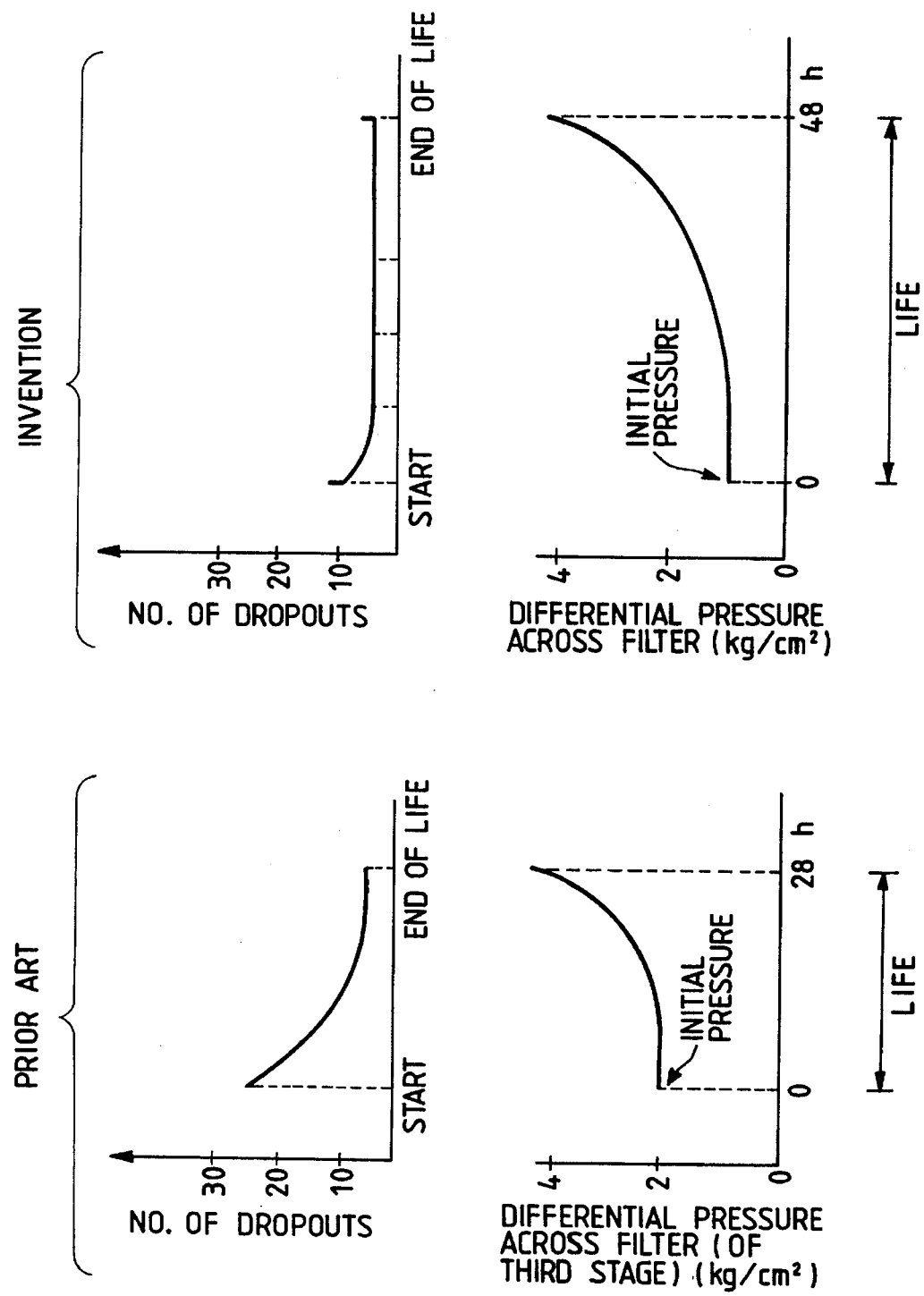
FIG. 7 shows graphically the number of dropouts in ½ magnetic tape samples and the pressure change that occurred in the filter system used to filter the magnetic fluids applied to prepare the tape samples.

FIG. 7 shows graphically the number of dropouts in samples of tape cassette which is indicative of the results of precision in the filtration of magnetic fluids for the manufacture of ½ in. magnetic tape cassettes, as well as the life of the filters employed. For counting the number of dropouts, each sample was set on a VHS tape deck and the number of dropouts that developed for 15 μsec at −20 dB per minute was counted on a DO counter model VDV-3D (product of Victor Co., of Japan, Ltd.).

The magnetic recording medium samples that used magnetic fluids filtered by the prior art filter system in the initial period produced more than 20 dropouts whereas the samples that used magnetic fluids filtered in the latter period produced less than 10 dropouts. Thus, the number of dropouts varied greatly. In contrast, the magnetic recording medium samples that used magnetic fluids filtered by the filter system of the present invention produced a substantially constant number ($\leq 10$) of dropouts throughout the operational period. Thus, the number of dropouts was stable.

The prior art filter system required an initial pressure as high as 2 kg/cm$^2$ and, hence, its life (as expressed by the time when the differential pressure across the filter element of the third stage reached 4 kg/cm$^2$) was only 28 h. On the other hand, the filter system of the present invention required only 1 kg/cm$^2$ as the initial pressure and, hence, its life was markedly extended to 48 h.

With the prior art filter system, the loss of magnetic fluids was 150 kg per each start of operation and 30 kg per each replacement of filter. However, the respective values decreased markedly with the filter system of the present invention; the loss of magnetic fluids was 100 kg per each start of operation and 10 kg per each replacement of filter.

What is claimed is:

1. A method of filtering a thixotropic fluid which comprises passing the thixotropic fluid through a filter assembly containing at least three filter elements each having a different mesh size, with the filter elements being arranged in order of increasing fineness in mesh so that contaminating foreign matter and agglomerates in the thixotropic fluid are removed, wherein said thixotropic fluid is a magnetic paint comprising a ferromagnetic powder, a polymer binder and an organic solvent for dissolving said polymer binder.

2. A method according to claim 1, comprising filtering the thixotropic fluid with a filter apparatus which comprises a filter assembly that is loaded in a housing for receiving an inflow of the thixotropic fluid to be filtered and which is formed by stacking at least three filter elements having a different mesh in order of increasing fineness in mesh, said filter apparatus being so adapted that the thixotropic fluid supplied to the housing is passed through the filter assembly in said order in the housing so as to flow out of said housing without substantial drop in shear stress of the thixotropic fluid.

3. A method according to claim 2, wherein the filter assembly in the housing includes at least three filter elements in the form of a concentric cylinder having a filter element of the finest mesh provided along the central axis, with filter elements of decreasing fineness in mesh being stacked successively in order and radially outward so that the thixotropic fluid will be passed through the filter assembly from the outer circumference toward the central axis.

4. A method according to claim 2, wherein the filter assembly comprises two to five filter elements.

5. A method according to claim 4, wherein the filter assembly comprises three filter elements.

6. A method according to claim 5, wherein the filter elements have a mesh size of 4 μm to 18 μm.

7. A filter apparatus for filtering a thixotropic fluid which comprises a filter assembly that is loaded in a housing for receiving an inflow of the thixotropic fluid to be filtered and which is formed by stacking at least three filter elements having a different mesh in order of increasing fineness in mesh, said filter apparatus being so adapted that the thixotropic fluid supplied to the housing is passed through the filter assembly in said order in the housing so as to flow out of said housing without substantial drop in shear stress of the thixotropic fluid, wherein said thixotropic fluid is a magnetic paint comprising a ferromagnetic powder, a polymer binder and an organic solvent for dissolving said polymer binder.

8. A filter apparatus according to claim 7, wherein the filter assembly in the housing includes at least three filter elements in the form of a concentric cylinder having a filter element of the finest mesh provided along the central axis, with filter elements of decreasing fineness in mesh being stacked successively in order and radially outward so that the thixotropic fluid will be passed through the filter assembly from the outer circumference toward the central axis.

9. The filter apparatus according to claim 7, wherein the filter assembly comprises three to five filter elements.

10. The filter apparatus according to claim 9, wherein the filter assembly comprises three filter elements.

* * * * *